No. 888,964. PATENTED MAY 26, 1908.
G. J. DAWBARN.
JIGGING MACHINERY FOR DRESSING ORE.
APPLICATION FILED NOV. 2, 1904.
2 SHEETS—SHEET 1.
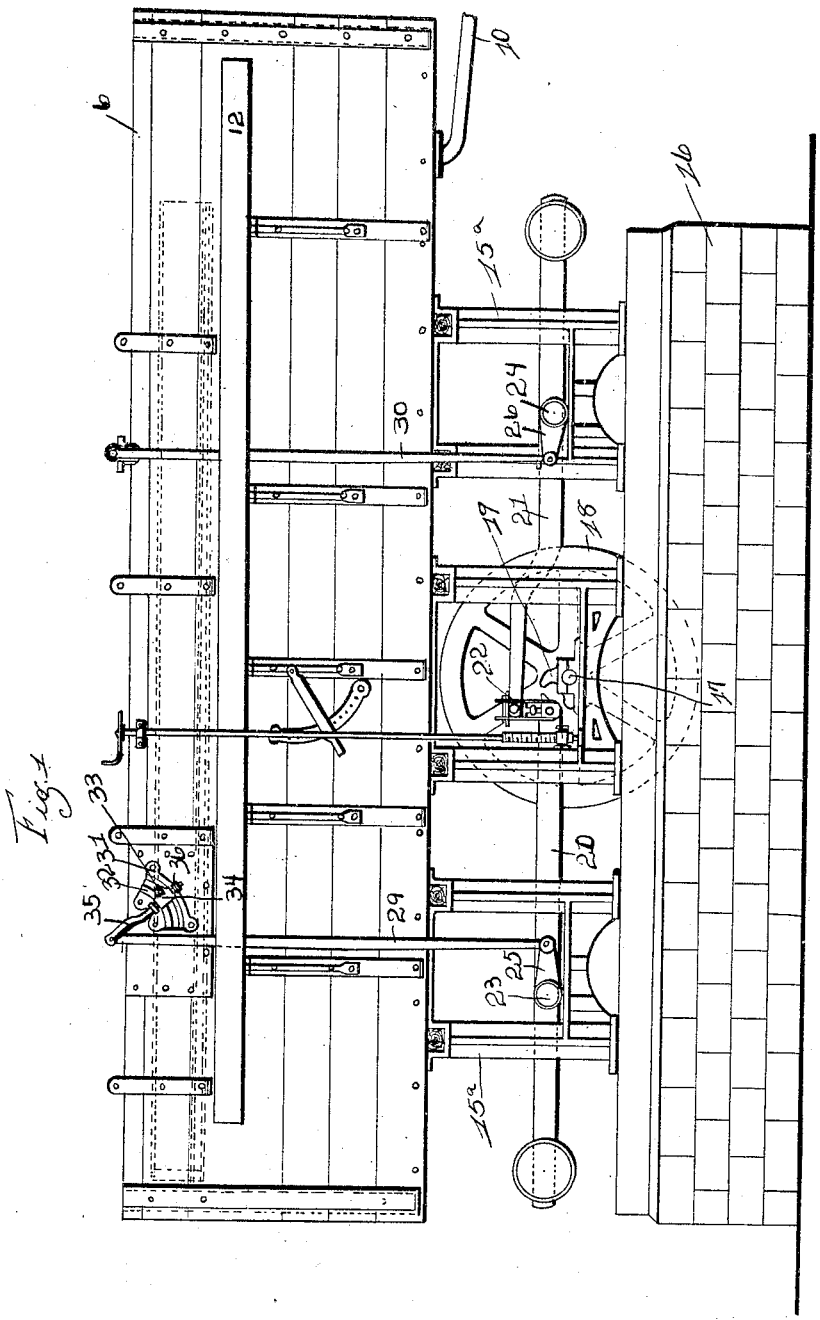
WITNESSES:
INVENTOR:
Gilbert J Dawbarn
By Higdon Langan & Hopkins Attys No. 888,964. PATENTED MAY 26, 1908.
G. J. DAWBARN.
JIGGING MACHINERY FOR DRESSING ORE.
APPLICATION FILED NOV. 2, 1904.
2 SHEETS—SHEET 2.
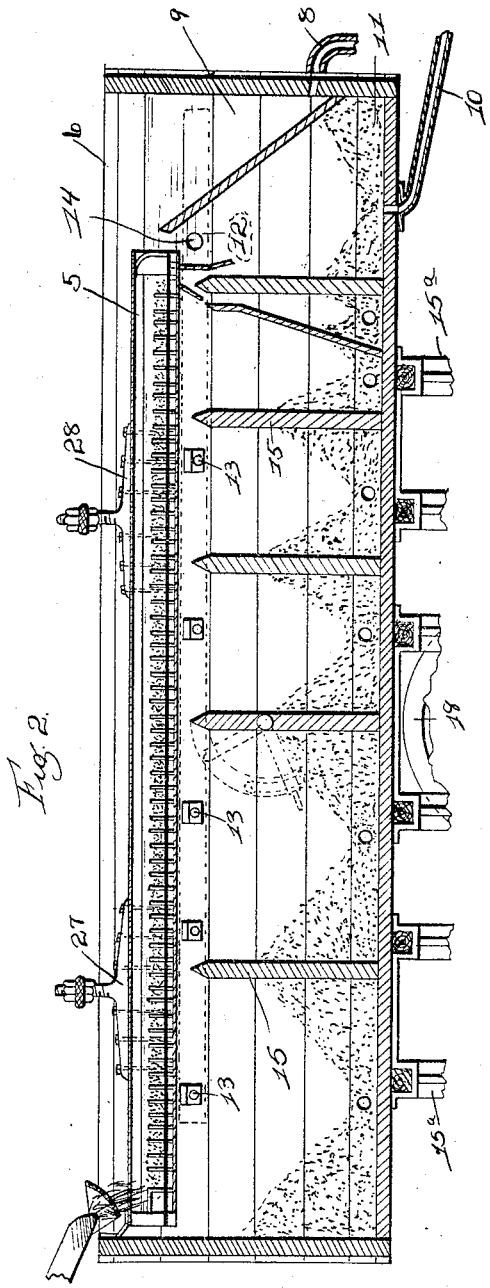
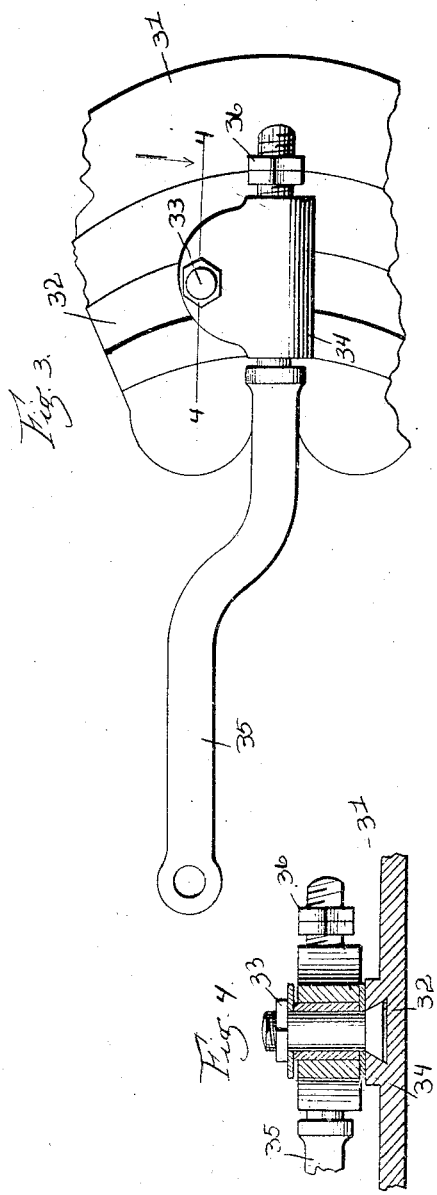
WITNESSES:
Edw M Harrington
Alfred Lewis
INVENTOR:
Gilbert J. Dawbarn
by Higdon & Longan & Hopkins attys

UNITED STATES PATENT OFFICE.

GILBERT J. DAWBARN, OF BALLARAT, VICTORIA, AUSTRALIA, ASSIGNOR, BY MESNE ASSIGNMENTS, TO ALLIS-CHALMERS COMPANY, OF MILWAUKEE, WISCONSIN, A CORPORATION OF NEW JERSEY.

JIGGING MACHINERY FOR DRESSING ORE.

No. 888,964.     Specification of Letters Patent.     Patented May 26, 1908.

Application filed November 2, 1904. Serial No. 231,123.

*To all whom it may concern:*

Be it known that I, GILBERT J. DAWBARN, a subject of the King of Great Britain, and resident of Ballarat, Victoria, Australia, have invented certain new and useful Improvements in Jigging Machinery for Dressing Ore, of which the following is a specification, containing a full, clear, and exact description, reference being had to the accompanying drawings, forming a part hereof.

This invention relates to improvements in jigging machinery for dressing ores, especially washing, separating and concentrating of ores.

It relates particularly to improvements in the machine shown in the United States Patent Number 540,659 granted to Henry Richard Hancock June 11, 1895, in which a sieve submerged or partly submerged in water within a hutch moves with a longitudinal motion as well as with a rise and fall.

The object of the invention is to improve the Hancock motion so as to give a more efficient jigging action.

In the accompanying drawings, Figure 1 is a side elevation of a jigging machine embodying the principles of my invention; Fig. 2 is a sectional elevation in a plane parallel with that of Fig. 1; Fig. 3 is an enlarged elevation of one of the two side connecting-links causing the endwise motion of the sieve; Fig. 4 is a section on the line 4—4 of Fig. 3, showing a detail of the adjustment for the side connecting-links.

Referring to the drawing, a belt driven shaft 17 has mounted thereon a fly wheel 18 and a three-point cam 19. Rock levers 20, 21, are respectively mounted on rock shafts 23, 24. On the rock shafts 23, 24, are also mounted crank arms 25, 26, which serve to support the sieve 5 by means of side rods 29, 30, extending upwardly from the ends of the respective crank arms 25, 26, to which they are pinned and connecting at their upper ends to respective cross bars 27, 28, rigidly extended from the sieve 5 over the sides of the hutch 6.

The hutch 6 is mounted by intermediate supports 15ª on a masonry foundation 16. The rock shafts 23, 24, and the belt driven shaft 17 are conveniently mounted underneath the hutch 6 upon the supports 15ª. The hutch 6 is divided into compartments by partitions 15 extending well up underneath the sieve 5. The discharge of material from these compartments takes place through ports near the bottom of the hutch, a discharge spout 10 being shown connected to one of these ports for discharging the material 11. A slant partition at the end of the hutch forms a quiescent compartment 9 for the settling of slimes discharged later through spout 8, but this is not my invention. A launder 12 extends along the outside of the hutch 6 and communicates therewith through ports 13 provided with flap valves closing against discharge from the hutch. These ports are located at a level just below the sieve 5. A separate port 14 forms communication between the launder and hutch beyond the end of the sieve.

This invention relates particularly to the guiding means for the sieve to cause it to have a closed path motion of a peculiar kind. By closed path motion is meant a motion which during the return stroke takes a different path than during the forward stroke. This guiding means is as follows: Side connecting-links 35 extend for connection to the hutch 6, from the ends of one of the cross bars 27 to which the side rods 29 are also connected, the connections to the cross bar all being pivotal. The links 35 extend at an angle to the vertical alongside the sides of the hutch through blocks 34 pivoted on pins 33 adjustably fixed in dove tail slots 32 formed in plates 31 attached to the sides of the hutch 6 opposite each other. Each link 35 is formed with shoulders where it passes through its block 34, one of these being adjustable and taking the form of lock nuts 36 in the illustration. There is thus provided a lost motion between the link 35 and its block 34, that is, a difference of motion due to looseness of parts or play between the parts. A lost motion connection is in this way provided between the sieve and the hutch. The link 35 can be called a passive means actuating the sieve, if at all, passively by guiding the upward sieve motion received by the sieve from the active actuating means the element of which directly coacting with the sieve being the side rod 29. The active actuating means receives "power" or force and transmits it to the sieve while the passive means receives and transmits no force but by its connections with other parts merely passively guides the sieve and modifies the motion thereof due to the active actuating means.

In operation the sieve 5 will be actuated to different levels by the actuating mechanism applied to the cross bars 27, 28. An upward impulse is given to the sieve and during the first part of the motion from the minimum level the sieve is free from the influence of structural compelling means to move endwise because of the lost motion between the parts connecting the sieve of the hutch. Later the sieve is constrained to move so as to have its points of attachment to side connecting-links 35 swing about the pivot pins 33 with the links 35 extended through blocks 34 to their greatest length. The sieve is therefore not free to move endwise in the one direction during the latter part of its upward motion but is constrained to move with a motion of translation parallel to the arc with radius equal to the length of side connecting-link 35 extended. This completes the forward stroke. At the beginning of the return stroke, that is during the first part of the sieve motion from the maximum level the actuating mechanism is free to fall vertically by gravity with the sieve and the sieve is also free from the influence of structural compelling means to move endwise in either direction, there being no restraint whatever imposed. This is because the links 35 begin to retract in length by sliding in the blocks 34. When the links 35 have retracted the extent of their lost motion in the block 34, they exert a guiding effort upon the sieve to cause it to take a motion of translation parallel to the arc with radius equal to the length of side connecting-link 35 retracted. During the latter part of the return stroke the sieve is therefore not free to move endwise in the one direction. These are the theoretical motions which in practice are widely differed from because of the immense amount of inertia and momentum of the loaded sieve.

The ore is delivered to the sieve and worked along and through the same in an efficient manner by the mechanism described. The water has a circulation from the launder to the hutch thence up through the sieve and flowing along in the same direction as that of the material on the sieve, reaches the delivery end of the sieve and passes through the port 14 back to the launder.

It should be understood that it is not desired to be limited to the exact details of construction disclosed, for obvious modifications will occur to a person skilled in the art.

What is claimed and desired to secure by Letters Patent is,—

1. In a jigging machine, the combination with a hutch and with a sieve therein of mechanism for actuating the sieve to different levels, and guiding means, additional to the actuating mechanism, for constraining the sieve to move endwise, the sieve being free from the influence of structural compelling means to move endwise in either direction during the first part of the motion of the sieve from the maximum or minimum level.

2. In a jigging machine, the combination with a hutch and with a sieve therein of mechanism for actuating the sieve to different levels, and guiding means, additional to the actuating mechanism, for constraining the sieve to move endwise, the sieve being free from the influence of structural compelling means to move endwise in either direction during the first part of its upward motion.

3. In a jigging machine, the combination with a hutch and with a sieve therein of mechanism for actuating the sieve to different levels, and guiding means, additional to the actuating mechanism, for constraining the sieve to move endwise, the sieve being free from the influence of structural compelling means to move endwise in either direction during the first part of its downward motion.

4. In a jigging machine, the combination with a hutch and with a sieve therein of active means for actuating the sieve, and passive means, additional to and modifying the motion of the actuating means, for guiding the sieve and forming a lost motion connection between the sieve and the hutch whereby the sieve will have a closed path motion.

5. In a jigging machine, the combination with a hutch and with a sieve therein of means for transmitting power to the sieve for actuating the sieve, and a plurality of links, additional to the power transmitting means, for guiding the sieve to move the same endwise, the said links connecting the sieve to the hutch and each connection having a lost motion for varying the effective operative length of the link.

6. In a jigging machine, the combination with a hutch and with a sieve therein of means for transmitting power to the sieve for actuating the sieve, and a plurality of passive connections, additional to the power transmitting means, between the sieve and the hutch for guiding the sieve to move the same endwise, each connection comprising a plurality of parts one of which is slidable with respect to another whereby the motion of the sliding parts becomes an active factor of the motion of the sieve.

7. In a jigging machine, the combination with a hutch and with a sieve therein of mechanism for actuating the sieve to different levels, and links angularly disposed to the vertical connecting the sieve to the hutch for guiding the sieve, each of the links having a plurality of parts one of which has lost motion with respect to another, the sieve being free to move endwise during the first part of its motion from the maximum or minimum level.

8. In a jigging machine, the combination with a hutch and with a sieve therein of active means for actuating the sieve to different levels, and passive means, additional to and modifying the motion of the actuating means, for guiding the sieve and forming a lost motion connection between the sieve and the hutch whereby the sieve will have a motion the return path of which is different from the forward path, the sieve being free to fall vertically by gravity during the first part of its downward motion.

9. In a jigging machine, the combination with a hutch and with a sieve therein of mechanism for actuating the sieve to different levels, and means, additional to the actuating means for constraining the sieve to move endwise, the sieve being free from the influence of structural compelling means during the first part of its downward motion both to move endwise in either direction and to fall vertically by gravity.

10. In a jigging machine, the combination with a hutch and with a sieve therein of mechanism for actuating the sieve to different levels, and means for constraining the sieve to move endwise, the said means extending during the first part of the upward motion of the sieve and retracting during the first part of the downward motion of the sieve whereby the sieve will have a closed path motion.

11. In a jigging machine the combination with a hutch and with a sieve therein of mechanism for actuating the sieve to different levels, there being a connection between the hutch and the sieve for constraining the sieve to move endwise, the sieve being free from the influence of structural compelling means to move endwise in either direction during the first part of its upward or downward motion.

12. In a jigging machine, the combination with a hutch and with a sieve therein of mechanism for actuating the sieve to different levels, and guiding means for constraining the sieve to move endwise, the guiding means being inactive during the inception of each up or down stroke of the sieve.

13. In a jigging machine, the combination with a hutch and with a sieve therein of mechanism for actuating the sieve to different levels, and guiding means for constraining the sieve to move endwise, the guiding means being inactive during the inception of each up-stroke of the sieve.

14. In a jigging machine, the combination with a hutch and with a sieve therein of mechanism for actuating the sieve to different levels, and guiding means for constraining the sieve to move endwise, the guiding means being inactive during the inception of each down-stroke of the sieve.

In testimony whereof, I have signed my name to this specification, in presence of two subscribing witnesses.

GILBERT J. DAWBARN.

Witnesses:
T. C. CAPEN,
OLIVIA ALLEN.